(12) United States Patent
Yang

(10) Patent No.: US 7,290,914 B2
(45) Date of Patent: Nov. 6, 2007

(54) LIGHT SOURCE DEVICE

(75) Inventor: Chih-Rong Yang, Taipei Hsien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 28 days.

(21) Appl. No.: 11/306,210

(22) Filed: Dec. 20, 2005

(65) Prior Publication Data

US 2007/0139959 A1 Jun. 21, 2007

(51) Int. Cl.
*H01L 33/00* (2006.01)
(52) U.S. Cl. .................. 362/555; 362/611; 362/631
(58) Field of Classification Search ................ 362/603, 362/611–612, 624, 555, 631
See application file for complete search history.

(56) References Cited

U.S. PATENT DOCUMENTS

| | | | |
|---|---|---|---|
| 6,508,564 B1* | 1/2003 | Kuwabara et al. | 362/612 |
| 6,786,626 B2* | 9/2004 | Wu et al. | 362/555 |
| 2005/0018448 A1* | 1/2005 | Pashley et al. | 362/555 |
| 2005/0270794 A1* | 12/2005 | Okamoto et al. | 362/555 |

* cited by examiner

*Primary Examiner*—Ali Alavi
(74) *Attorney, Agent, or Firm*—Jianq Chyun IP Office

(57) ABSTRACT

A light source device including a light-guiding pillar, an opaque layer, and a light source is provided. The light-guiding pillar has a light incident surface and a light emitting surface, and the light incident surface is adjacent to the light emitting surface. In addition, the opaque layer is disposed on the surfaces of the light-guiding pillar outside the light incident surface and the light emitting surface. The light source is disposed near the light incident surface. The light emitted from the light source propagates into the light-guiding pillar through the light incident surface, and then emits from the light emitting surface.

12 Claims, 3 Drawing Sheets

LIGHT SOURCE DEVICE

BACKGROUND OF THE INVENTION

1. Field of Invention

The present invention relates to a light source device. More particularly, the present invention relates to a light source device using a light-guiding pillar.

2. Description of Related Art

Modern electronic devices, such as desktop PC, notebook laptop, etc., usually come with an identification logo in the form of serial number or trademark, etc. These identification logos help the customers to identify the manufacturer and model of the product. On the other hand, the trademark is also a useful tool for the manufacturer to build their brand name, avoid counterfeit and improve the value-added potential of the product.

As mentioned above, in order for the identification logos to have showy appearance on the case of the electric products, the identification logos usually apply luminescence device to highlight the logos. At the same time, the overall appearance of the electric product is improved. In addition, function indicator light is also disposed on the case of the electric products, and the function indicator light can also apply the luminescence device.

However, the expensive luminescence device may substantially increase the fabricating cost of the electric product. Therefore, how to develop a light source device of low cost and good efficiency has become an important topic.

SUMMARY OF THE INVENTION

Accordingly, the present invention is directed to provide a light source device to reduce the fabricating cost.

The present provides a light source device, including a light-guiding pillar, an opaque layer, and a light source. Wherein, the light-guiding pillar has a light incident surface and a light emitting surface, and the light incident surface is adjacent to the light emitting surface. In addition, the opaque layer is disposed on the surfaces of the light-guiding pillar outside the light incident surface and the light emitting surface. The light source is disposed near the light incident surface. The light emitted from the light source propagates into the light-guiding pillar through the light incident surface, and then emits from the light emitting surface.

According to one embodiment of the present invention, the light source is, for example, a light-emitting diode (LED).

According to one embodiment of the present invention, the light-guiding pillar is, for example, cylindrical pillar or angular pillar.

According to one embodiment of the present invention, the light-guiding pillar is, for example, quadrangle pillar.

According to one embodiment of the present invention, the material of the opaque layer is, for example, paint.

According to one embodiment of the present invention, the light source device further includes a circuit board, and the light-guiding pillar and the light source are disposed on the circuit board.

According to one embodiment of the present invention, the light source device further includes a power plug, wherein the power plug is, for example, disposed on the circuit board and electrically connected to the power through the circuit board.

According to one embodiment of the present invention, the light source device further includes a light source fastening frame, wherein the light source fastening frame is disposed on the circuit, and the light source is fixed on the circuit board by the light source fastening frame.

According to one embodiment of the present invention, the light-guiding pillar further has a first fastening structure, and the circuit board has a second fastening structure, and the light-guiding pillar is fixed on the circuit board through the coupling of the first fastening structure and the second fastening structure.

According to one embodiment of the present invention, the first fastening structure may be a bolt, and the second fastening structure may be a jack. Of course, the first fastening structure could be a jack, and the second fastening structure may be a bolt.

The light source device of the present invention applies the light-guiding pillar coated with the opaque layer, so that the light emitted from the light source propagates into the light-guiding pillar through the light incident surface, and then emits from the light emitting surface. The light source device of the present invention has the advantage of low fabricating cost.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
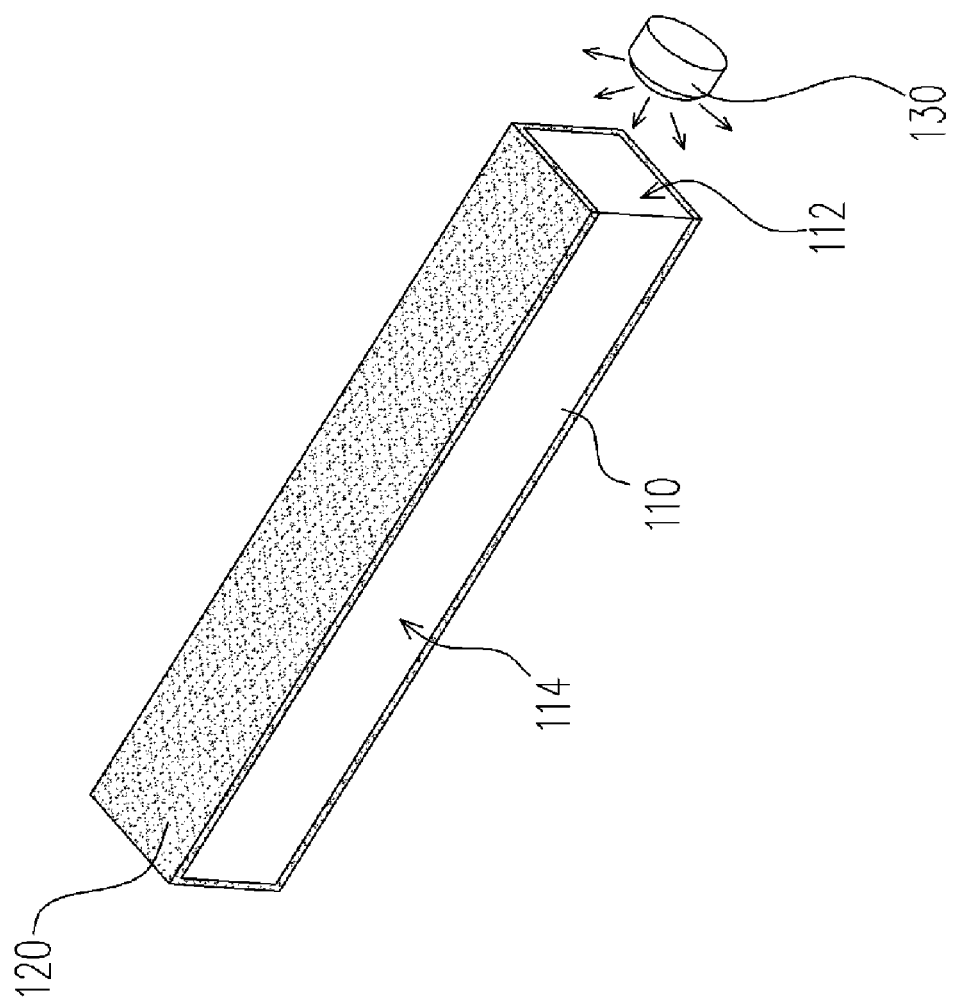
FIG. 1 is a schematic solid diagram of a light source device according to a first embodiment of the present invention.

FIG.1 is a schematic solid diagram of a light source device according to a first embodiment of the present invention. Referring to FIG. 1, a light source device 100 of the present invention includes a light-guiding pillar 110, an opaque layer 120, and a light source 130. In the embodiment, the light-guiding pillar 110 has a light incident surface 112 and a light emitting surface 114, wherein the light-guiding pillar 110 of the embodiment is, for example, a quadrangle pillar. Of course, in other preferred embodiments of the present invention, the light-guiding pillar 110 may also be an angle pillar or cylindrical or other shapes. The light incident surface 112 of the light-guiding pillar 110 is adjacent to the light emitting surface 114. And, the opaque layer 120 is disposed on the surfaces of the light-guiding pillar 110 outside the light incident surface 112 and the light emitting surface 114. That is, the opaque layer 120 of the embodiment is disposed on the four surfaces of the light-guiding pillar 110 outside the light incident surface 112 and the light emitting surface 114. In addition, the light source 130 is disposed near the light incident surface 112 of the light-guiding pillar 110, and the light source 130 is, for example, a light-emitting diode (LED). The light emitted from the light source 130 propagates into the light-guiding pillar 110 through the light incident surface 112, and then emits from the light emitting surface 114 after propagated inside the light-guiding pillar 110.

Here the transmission path of the light emitted from the light source 130 is described. Referring to FIG. 1, as the light incident surface 112 of the light-guiding pillar 110 is adjacent to the light emitting surface 114, and the opaque layer 120 is disposed on the surfaces of the light-guiding pillar 110 outside the light incident surface 112 and the light emitting surface 114, after the light emitted from the light source 130 propagates into the light-guiding pillar 110 through the light incident surface 112, the light may be affected by the opaque layer 120 and reflected in the light-guiding pillar 110 coated with the opaque layer 120, and then emits from the light emitting surface 114 of the light-guiding pillar 110. Accordingly, the light emitted from the light source 130 can emit from the light emitting surface 114 of the light-guiding pillar 110 effectively with fewer energy loss. The opaque layer 120 can cover the surfaces of the light-guiding pillar 110 outside the light incident surface 112 and the light emitting surface 114 by way of spraying, and the material of the opaque layer 120 may be paint or other opaque material. The color of the paint or opaque material may be white, blue or other suitable color, so that the light emitted from the light emitting surface 114 of the light-guiding pillar 110 may be various colors light such as white light, blue light, etc.

The above-mentioned light source device 100 is not the only embodiment of the present invention. Other embodiments are described in the following, and the same identification numbers are used for the same elements.

Figure 2:
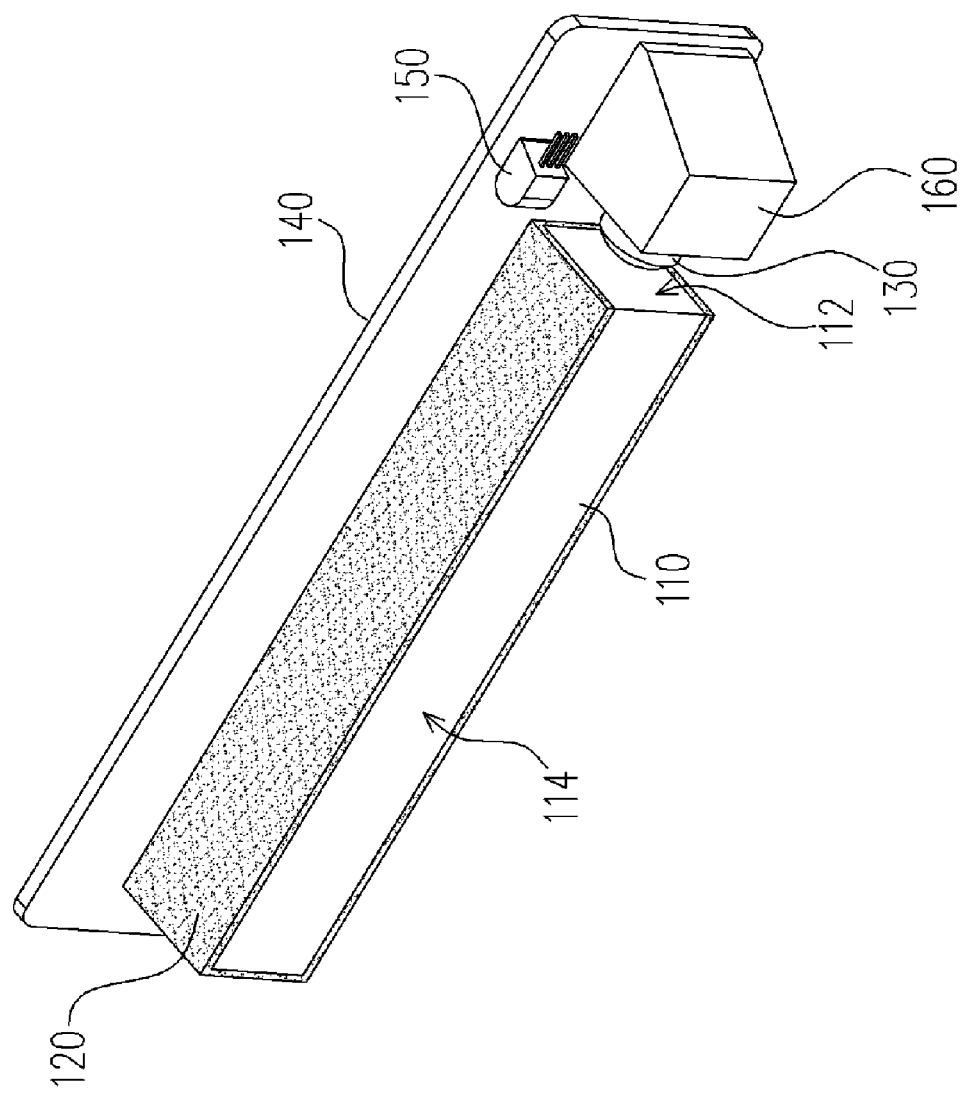
FIG. 2 is a schematic solid diagram of a light source device according to a second embodiment of the present invention.
Figure 3:
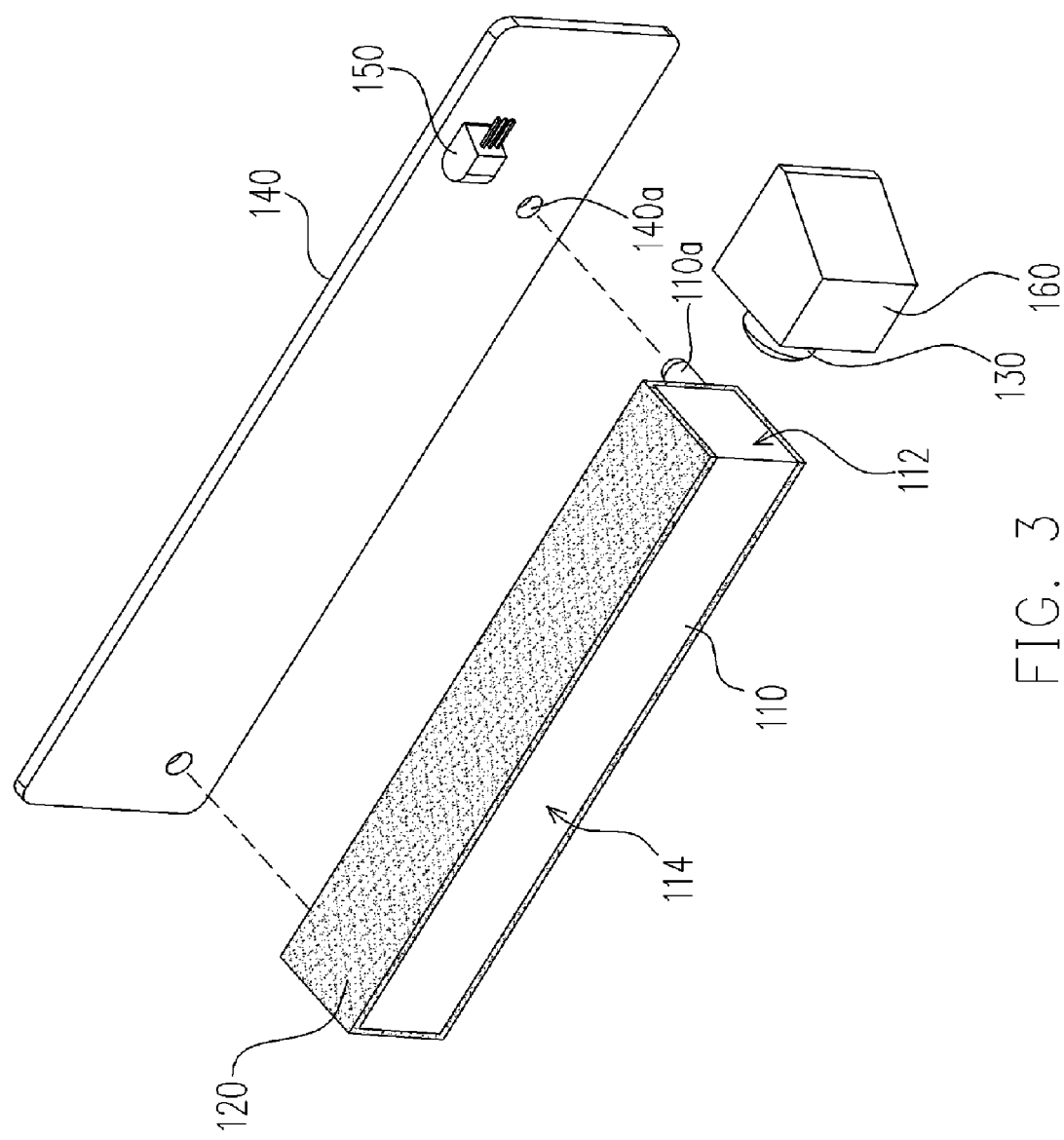
FIG. 3 is the decomposition diagram of the light source device in FIG. 2.

FIG. 2 is a schematic solid diagram of a light source device according to a second embodiment of the present invention, and FIG. 3 is a decomposition diagram of the light source device in FIG. 2. Referring to FIG. 2 and FIG. 3, the light source device 200 of the embodiment further includes a circuit board 140 outside the light-guiding pillar 110, the opaque layer 120 and the light source 130. Wherein, the light-guiding pillar 110 and the light source 130 are disposed on the circuit board 140, wherein the light source 130 is electrically connected to the circuit board 140. In addition, the light source 200 includes, for example, a power plug 150, wherein the power plug 150 is used to electrically connect a power supplier (not shown). The power plug 150 of the embodiment is disposed on the circuit board 140 and electrically connected to the circuit board 140, so that the energy can be transferred to the light source 130 through the power plug 150 and the circuit board 140. Accordingly the light source 130 can emit light.

As mentioned above, in order to fix the light-guiding pillar 110 on the circuit board 140, the light-guiding pillar 110 further has a first fastening structure 110a, and the circuit board 140 correspondingly has a second fastening structure 140a. The light-guiding pillar 110 is fixed on the circuit board 140 through the coupling of the first fastening structure 110a and the second fastening structure 140a of the circuit board 140. In the embodiment, the first fastening structure 110a is, for example, a bolt, and the second fastening structure 140a is, for example, a jack. Of course, the first fastening structure 110a could be, for example, a jack, and the second fastening structure 140a could be, for example, a bolt. The present invention does not limit the structures and shapes of the first fastening structure 110a and the second fastening structure 140a. In addition, the light-guiding pillar 110 can also be fixed on the circuit board 140 by binding or other methods. In another aspect, the light source device 200 further includes a light source fastening frame 160, disposed on the circuit board 140 and near the light incident surface 112 of the light-guiding pillar 110, and the light source 130 is fixed on the light source fastening frame 160.

The light source device of the present invention is mainly applied in the electric products such as desktop PC, notebook laptop. The above electric products usually need a plurality of light sources as function indicator or ornament, and the light source of the present invention can be disposed in the luminescence area of the electric product to provide even back light source. In addition, as the light source device of the present invention applies a module design, it is suitable to be disposed in different kinds of electric products. Accordingly, there is no need to re-develop new module to fabricate the light source device for each new kind of electric product. Therefore, the fabricating cost of the electric product will be reduced. In detail, the light source device of the present invention can be modulized and is easy to assemble. Accordingly, as long as the size of the luminescence area is not greater than the light source device, all of the electric products of different models can apply the light source device of the present invention.

In another aspect, the manufacturer may add patterned design on the case of the electric product in order to beautify the appearance, and the light source device of the present invention can also enhance the patterned design on the case.

In summary, using the light-guiding pillar coated with the opaque layer, the light source device of the present invention transmits the light emitted from the light source to the illumination position according to the design of the electric product. Compared with the conventional light source device, the light source device of the present invention has lower fabricating cost. In another aspect, as the light source device of the present invention can be modulized and is easy to assemble, the light source device is suitable for electric products of different models. Further, the time of developing new module can be saved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light source device, including:
   a light-guiding pillar, having a first fastening structure, a light incident surface and a light emitting surface, and the light incident surface is adjacent to the light emitting surface;
   an opaque layer, disposed on the surfaces of the light-guiding pillar outside the light incident surface and the light emitting surface;
   a light source, disposed near the light incident surface, wherein the light emitted from the light source propagates into the light-guiding pillar through the light incident surface, and then emits from the light emitting surface; and
   a circuit board, having a second fastening structure, wherein the light-guiding pillar and the light source are disposed on the circuit board, the light-guiding pillar is fixed on the circuit board through the coupling of the first fastening structure and the second fastening structure, and the first fastening structure and the second fastening structure is a combination of a bolt and a jack.

2. The light source device as claimed in claim 1, wherein the light source includes a light-emitting diode (LED).

3. The light source device as claimed in claim 1, wherein the light-guiding pillar is a cylindrical pillar or an angular pillar.

4. The light source device as claimed in claim 3, wherein the light-guiding pillar is a quadrangle pillar.

5. The light source device as claimed in claim 1, wherein the material of the opaque layer includes paint.

6. The light source device as claimed in claim 1, further including a power plug, disposed on the circuit board, the power plug being electrically connected to the power through the circuit board.

7. The light source device as claimed in claim 1, further including a light source fastening frame, disposed on the circuit, the light source being fixed on the circuit board by the light source fastening frame.

8. A light source device, comprising:
- a light-guiding pillar, having a light incident surface, a light emitting surface adjacent to the light incident surface, and a first securing structure formed at one of the surfaces of the light-guiding pillar outside the light incident surface and the light emitting surface;
- an opaque layer, disposed on the surfaces of the light-guiding pillar outside the light incident surface and the light emitting surface;
- a circuit board, the light-guiding pillar and the light source being disposed on the circuit board, the circuit board having a second fastening structure configured for engaging with the first fastening structure to fasten the light-guiding pillar to the circuit board; and
- a light source, disposed near the light incident surface, wherein the light emitted from the light source propagates into the light-guiding pillar through the light incident surface, and then emits from the light emitting surface.

9. The light source device as claimed in claim 8, wherein one of the first fastening structure and the second fastening structure comprises a bolt, and the other one of the first fastening structure and the second fastening structure comprises a jack corresponding to the bolt.

10. A light source device, including:
- a quadrangle light-guiding pillar, having a light incident surface, a light emitting surface adjacent to the light incident surface, each of the surfaces of the light-guiding pillar outside the light incident surface and the light emitting surface being perpendicular to the light incident surface or the light emitting surface;
- an opaque layer, disposed on the surfaces of the light-guiding pillar outside the light incident surface and the light emitting surface;
- a circuit board, the light-guiding pillar and the light source being disposed on the circuit board; and
- a light source, disposed near the light incident surface, wherein the light emitted from the light source propagates into the light-guiding pillar through the light incident surface, and then emits from the light emitting surface.

11. The light source device as claimed in claim 10, wherein the light-guiding pillar comprises a first securing structure formed at one of the surfaces thereof outside the light incident surface and the light emitting surface, and the circuit board has a second fastening structure configured for engaging with the first fastening structure to fasten the light-guiding pillar to the circuit board.

12. The light source device as claimed in claim 11, wherein one of the first fastening structure and the second fastening structure comprises a bolt, and the other one of the first fastening structure and the second fastening structure comprises a jack corresponding to the bolt.

* * * * *